US009322692B2

(12) United States Patent
Kraige et al.

(10) Patent No.: US 9,322,692 B2
(45) Date of Patent: Apr. 26, 2016

(54) FLOW SENSOR INCLUDING A TUBE EXTENDING FROM A HOUSING AND STATIC AND STAGNATION PRESSURE PORTS ALONG THE TUBE

(71) Applicants: KCF TECHNOLOGIES, INC., State College, PA (US); Parker Hannifin Corporation, Cleveland, OH (US)

(72) Inventors: David R. Kraige, State College, PA (US); Jacob J. Loverich, State College, PA (US); Stephen J. Wenner, Port Matilda, PA (US); Jason T. Dunn, Minneapolis, MN (US); Shawn D. Ellis, Golden Valley, MN (US)

(73) Assignees: KCF TECHNOLOGIES, INC., State College, PA (US); PARKER HANNIFIN CORPORATION, Cleveland, OH (US)

( * ) Notice: Subject to any disclaimer, the term of this patent is extended or adjusted under 35 U.S.C. 154(b) by 12 days.

(21) Appl. No.: 14/227,635

(22) Filed: Mar. 27, 2014

(65) Prior Publication Data

US 2015/0276441 A1  Oct. 1, 2015

(51) Int. Cl.
  *G01F 1/88* (2006.01)
  *G01F 1/46* (2006.01)
(52) U.S. Cl.
  CPC ... *G01F 1/88* (2013.01); *G01F 1/46* (2013.01)

(58) Field of Classification Search
  None
  See application file for complete search history.

(56) References Cited

U.S. PATENT DOCUMENTS

| 3,876,009 A * | 4/1975 | Johnson, Jr. | G01F 1/38 73/861.65 |
|---|---|---|---|
| 2003/0140704 A1 * | 7/2003 | Kurtz | G01F 1/46 73/727 |
| 2007/0095150 A1 * | 5/2007 | Urbahn | G01F 1/46 73/861.65 |

* cited by examiner

*Primary Examiner* — Harshad R Patel
(74) *Attorney, Agent, or Firm* — Oliff PLC

(57) ABSTRACT

Flow sensor includes a housing having a chamber and a tube extending therefrom. Static and stagnation pressure ports are located along the tube and open in different directions about a periphery. A first conduit fluidly couples the static pressure port to the chamber, and a first pressure sensor senses the fluid pressure in the chamber. A differential pressure sensor has a first port and a second port in the chamber. The first port senses the fluid pressure in the chamber, and a second conduit fluidly couples the stagnation pressure port with the second port. The second port is more exposed to fluid flow through the pipe relative to the first port. Fluid flow rate through the pipe is determinable based on static fluid pressure sensed by the first pressure sensor, differential pressure measured by the differential pressure sensor, density of fluid in the pipe, and diameter of the pipe.

24 Claims, 4 Drawing Sheets

FLOW SENSOR INCLUDING A TUBE EXTENDING FROM A HOUSING AND STATIC AND STAGNATION PRESSURE PORTS ALONG THE TUBE

TECHNICAL FIELD

The present disclosure relates generally to a flow sensor and, more specifically, to a flow sensor for measuring the flow of fluid through a pipe.

BACKGROUND

In industrial environments, compressed air is a very common means of actuating equipment. Compressed air may be used to operate a very wide variety of machines including presses, grinders, drills, torque tools, cleaning equipment, and painting equipment, among numerous others. Compressed air piping (also known as air lines) is a necessary utility in almost any industrial facility, similar to electrical wiring or water plumbing. The piping network typically consists of a series of rigid and/or flexible pipes of gradually decreasing diameters radiating from a central compressor or bank of compressors to all the various locations of tools within the plant, just as water pipes radiate from a main pipe through smaller supply lines to all tap locations. As with any other utility, compressed air comes at an expense to the operator. The air pressure in the lines, which actuates all of the machines connected to the network, is typically produced by one or more air compressors, which are generally powered by electric motors. Thus, increased usage of compressed air in a facility directly translates to higher electrical consumption. Minimizing compressed air usage benefits the plant operator by reducing electricity costs, and benefits the environment by reducing fuel consumption to generate electricity.

In addition to striving to minimize overall air consumption, it is also important that a compressed air system be properly configured such that it can adequately supply all of the equipment dependent on it. A system that is not balanced and operating at good condition may lead to additional expenses or downtime for the operator. For instance, if a compressed air line is inadequately sized, or if a leak exists, or if a compressor is unable to supply enough air, or if an air filter is clogged, there may be an inadequate air supply at a tool. This could for instance lead to a torque tool not applying enough torque to a fastener, leading to defective products and plant downtime required to identify and rectify the problem.

Because of the concerns listed above, it is common for industrial facilities to be subjected to periodic compressed air "audits," which evaluate the usage of different parts of the compressed air system and identify potential issues which may lead to reduced productivity or increased cost and consumption. Example issues that could be identified might be air leaks, inadequate flow in a line, inadequate pressure in a line, excessive humidity in a line, clogged air filters, or an imbalance between different lines branching off from the compressor bank. Compressed air audits offer a valuable method to diagnose issues within a plant and improve its efficiency. However, there are several drawbacks to compressed air audits. First, by their nature, they are expensive events, requiring expensive airflow and pressure sensors and trained technicians to measure many aspects of the compressed air system and prepare a report. Because the equipment used is expensive, must be wired to receiver/analyzer equipment, and requires expert training to operate, it is impractical to buy many sensors and distribute them throughout the compressed air network. Instead, auditors use a few wired sensors and move them from one monitoring point to another over time to complete the audit. Further, it is impractical for most plant operators to perform in-house audits. Instead, outside firms are periodically hired to perform these audits, meaning data is collected infrequently, for instance every 6 or 12 months. This means that a problem condition could exist for many months creating additional costs and productivity problems before an audit would catch it.

A much more proactive and effective approach is to install a monitoring system consisting of a network of more inexpensive sensors throughout the compressed air system to monitor its health virtually continuously and identify problems as soon as they become detectable. An important component of such a system is an inexpensive but highly accurate sensor for measuring the air pressure inside the line, as well as the mass flow of compressed air through the line. An ideal embodiment of such a sensor would include a wireless radio for relaying the data from the sensor to a central receiving location, since plants can be quite expansive and running wires to a large number of sensors is impractical and costly. Deploying many such sensors throughout a compressed air network and sampling airflow and pressure data from them on a frequent basis, for instance every minute or every few seconds, would allow a plant operator to quantify the usage of different parts of the compressed air system, diagnose issues in real time, and implement solutions more quickly than traditional compressed air audits allow.

Novel solutions to these issues are presented in the following disclosure. It should be noted that while the background information provided and the sensor disclosed are targeted toward industrial compressed air, such a flow and pressure sensor could easily be adapted to measure the flow of additional fluids or gases other than air, including liquids.

SUMMARY

In some aspects of the disclosure, a flow sensor may include a housing including a body portion and a tube extending from the body portion. The body portion includes a chamber. A first, static pressure port and a second, stagnation pressure port are located along the tube. The first and second ports open in different directions about a periphery of the tube. A first, static pressure conduit fluidly couples the first, static pressure port of the tube to the chamber, and a first pressure sensor is configured to sense the fluid pressure in the chamber. A second, differential pressure sensor has a first port and a second port in the chamber. The first port of the second pressure sensor is exposed to the fluid pressure in the chamber, while a second, stagnation pressure conduit fluidly couples the second, stagnation pressure port of the tube to the second port of the second pressure sensor. The first and second ports are configured to be disposed in a pipe having fluid flowing therethrough such that the second port is directly exposed to the fluid flow and the moving fluid is brought to rest in the second conduit, relative to the first port, which is not directly exposed to the flow and therefore experiences only the static ambient pressure in the pipe. Because the fluid is brought to rest in the second port and conduit, it has an elevated pressure known as the "stagnation pressure" or "total pressure," as opposed to the lower "static pressure" at the first port and conduit. The second, differential pressure sensor measures the difference between the stagnation pressure and the static pressure, also known as the "dynamic pressure." The fluid flow rate through the pipe is determinable based on the static fluid pressure sensed by the first pressure sensor, the dynamic pressure measured by the differential pressure sensor, the density of the fluid in the pipe, and the pre-determined diameter of the pipe.

According to various aspects of the disclosure, a method for determining mass fluid flow through a pipe includes coupling a sensor assembly with a pipe having fluid flowing therethrough. The sensor assembly has first and second ports in the pipe, with the first port being oriented out of the direct flow of fluid and experiencing only the ambient static pressure in the pipe, and the second port is directly exposed to the fluid flow such that fluid enters the second port at an increased pressure, or "stagnation pressure." The method further includes directing fluid from the first port to a chamber of the sensor assembly, sensing fluid pressure in the chamber with a first pressure sensor, sensing a difference in fluid pressure between the second and first ports with a differential pressure sensor disposed in the chamber, and measuring the temperature of the fluid in the pipe. Fluid flow rate through the pipe is determined based on the fluid pressure sensed by the first pressure sensor, the differential pressure, or "dynamic pressure," measured by the differential pressure sensor, the density of the fluid in the pipe, and the pre-determined diameter of the pipe.

In accordance with some aspects of the disclosure, a flow sensor may include a housing including a body portion and a tube extending from the body portion. The body portion includes a chamber, and a first, static pressure port is located along the tube and fluidly coupled with the chamber. The flow sensor may include an absolute pressure sensor and a differential pressure sensor. The absolute sensor may be configured to sense the fluid pressure in the chamber. A second, stagnation pressure port is located along the tube and fluidly coupled with the differential pressure sensor. The differential pressure sensor may be configured to determine a pressure difference between the fluid pressure in the chamber and the fluid pressure at the second port. When the first and second ports are disposed in a pipe having fluid flowing therethrough such that the second port is more directly exposed to the fluid flow and experiences a higher pressure relative to the first port, the fluid flow rate through the pipe is determinable based on the fluid pressure sensed by the first pressure sensor, the differential pressure measured by the differential pressure sensor, the density of the fluid in the pipe, and the pre-determined diameter of the pipe.

DETAILED DESCRIPTION

Reference will now be made in detail to specific embodiments or features, examples of which are illustrated in the accompanying drawings. Generally, corresponding or similar reference numbers will be used, when possible, throughout the drawings to refer to the same or corresponding parts.

Figure 1:
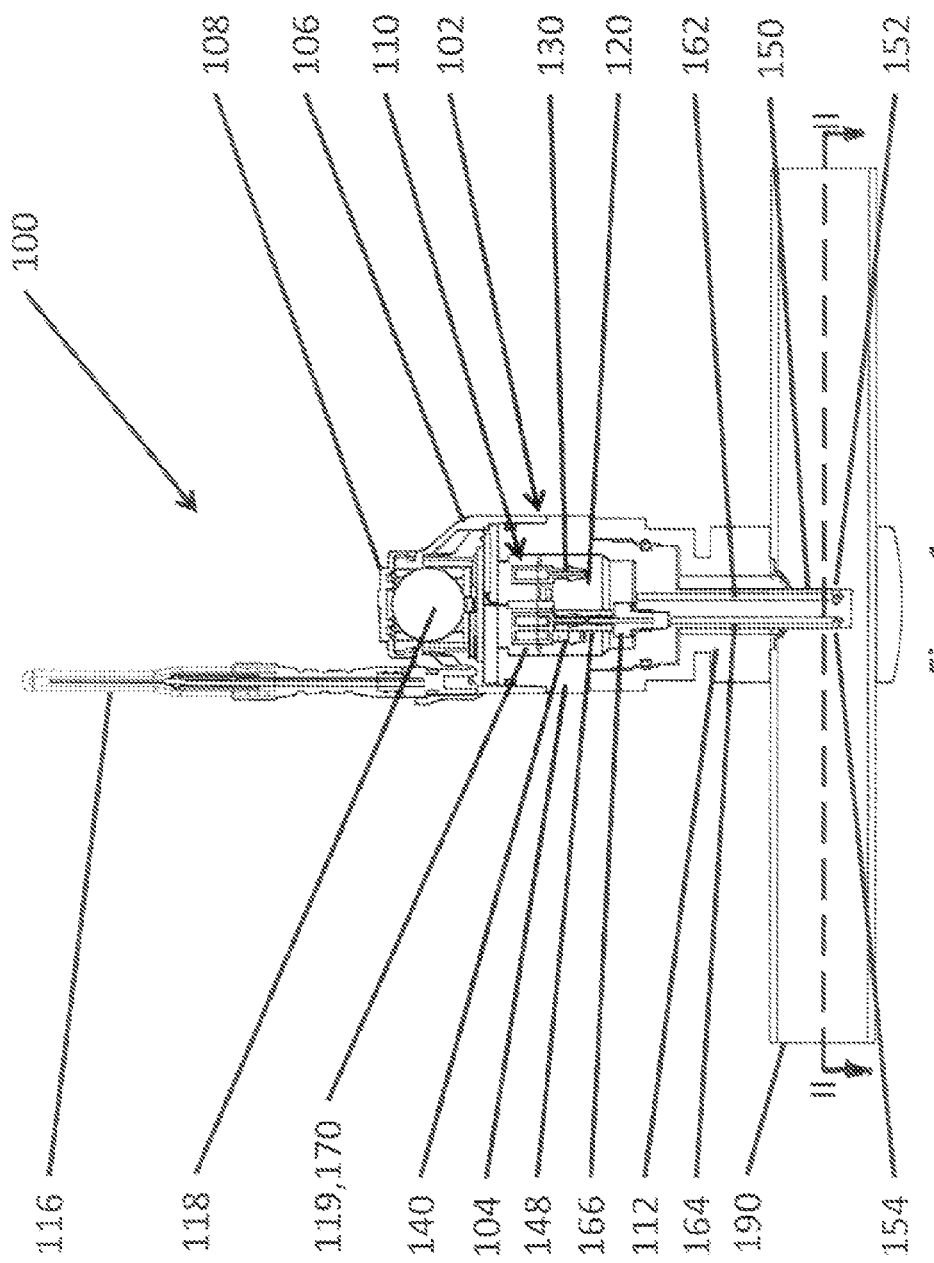
FIG. 1 is a cross-sectional view of an exemplary flow sensor, in accordance with aspects of the disclosure, illustrated as coupled with a pipe.
Figure 3:
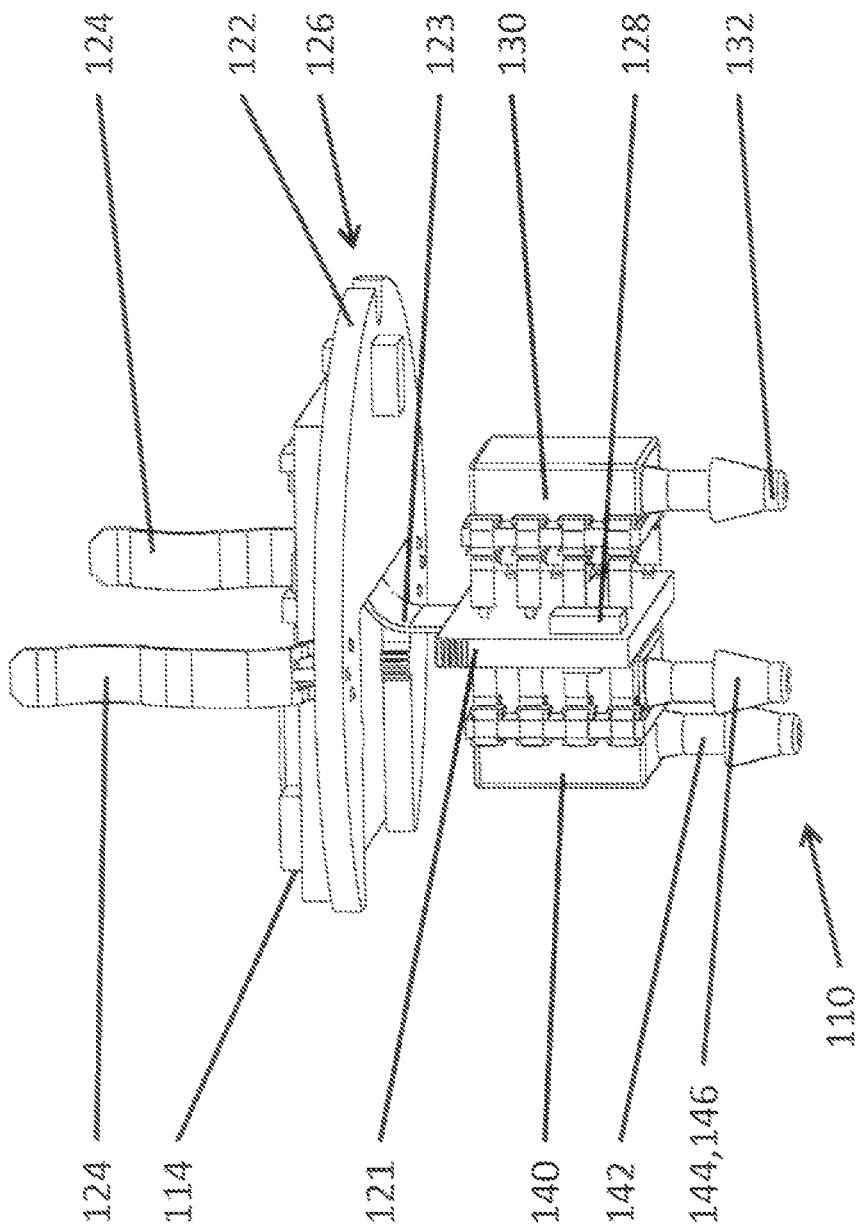
FIG. 3 is a diagrammatic view of the sensing arrangement of the exemplary flow sensor of FIG. 1.
Figure 4:
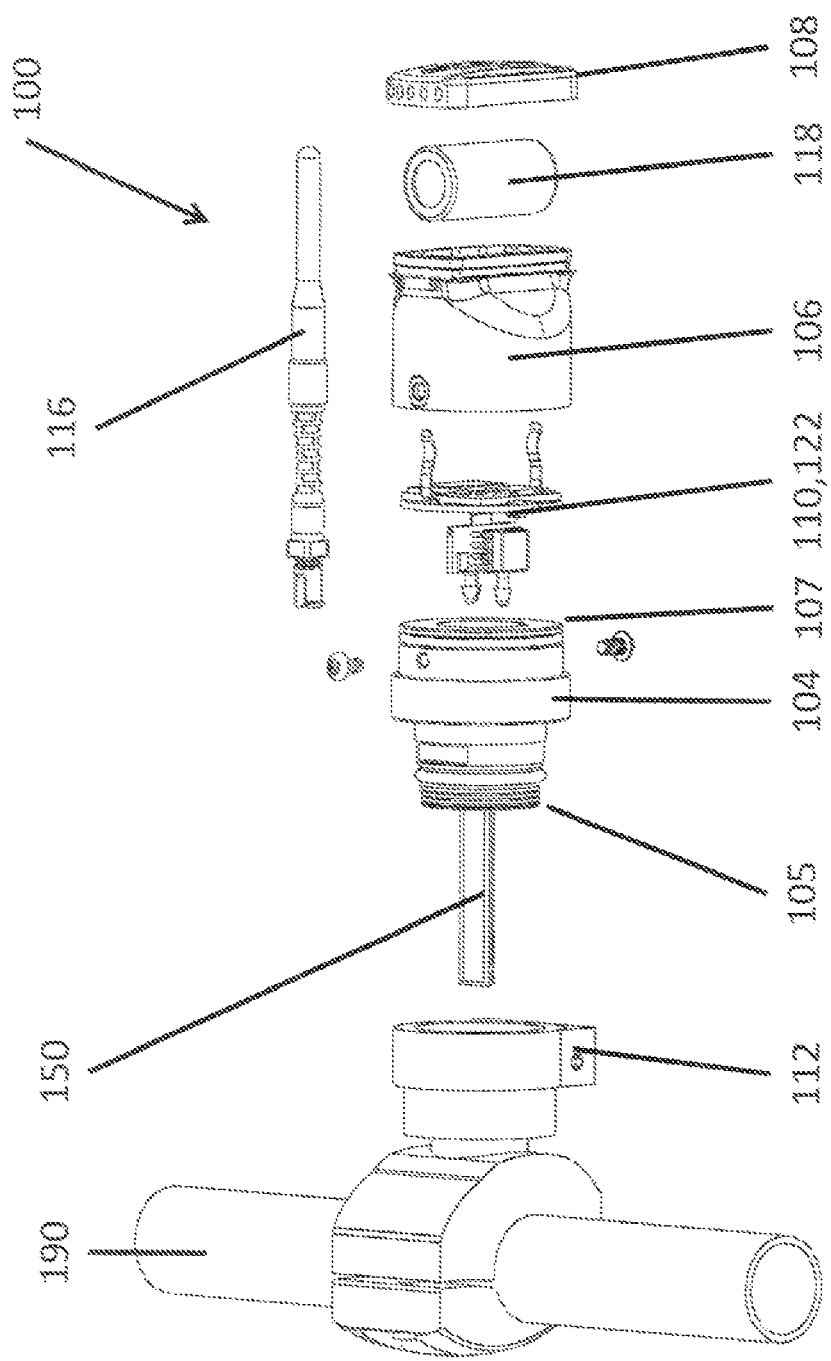
FIG. 4 is an exploded view of the exemplary flow sensor of FIG. 1.

FIGS. 1 and 4 illustrate a flow sensor 100 in accordance with various aspects of the disclosure. The flow sensor 100 includes a housing 102 having a chamber 120. The housing covers and protects a sensing arrangement 110 (FIG. 3) in the chamber 120. The flow sensor 100 may include a temperature sensor 128 arranged, for example, in the chamber 120 so as to sense the fluid temperature in the chamber 120. In some aspects, the housing 102 may include a first portion, or base, 104 and a second portion 106 fixedly coupled with one another. The housing 102 may further include a cover 108 removably coupleable with the second portion 106 of the housing 102.

In some aspects, the flow sensor 100 may include or be coupled with a mounting arrangement 112 extending from a bottom 105 of the first portion 104 of the housing 102. The mounting arrangement 112 may be configured to couple the flow sensor 100 with a pipe 190, the fluid flow through which may be measured by the flow sensor 100.

According to some aspects, the first portion 104 of housing 102 may be constructed of a material having a relatively high stiffness and strength so as to protect the sensor and circuitry housed therein and withstand the pressure applied to it by the fluid within the pipe. For example, in some aspects, the selected material may be able to withstand about 600 psi. In some aspects, the material of the first portion 104 of housing 102 may be a metal, for example, brass, aluminum, or steel, or a plastic or composite.

In addition to the sensing arrangement 110, the sensor 100 may further include a radio 114, an antenna 116, and a battery 118. The second portion 106 of the housing 102 may cover and protect the sensing arrangement 110, the radio 114, and the antenna 116. The radio 114 and antenna 116 may be, for example, an RF radio and antenna, respectively. It should be appreciated that the material of the second portion 106 of the housing 102 may be a metal, for example, aluminum or steel, or a composite. In some aspects, the second portion 106 may be fabricated out of a material with a low electromagnetic conductivity such as, for example, plastic or rubber.

The cover 108 can be removed from the second portion 106 of the housing 102 to provide a user with access to an interior compartment of the second portion 106 of the housing 102, which can contain the battery 118. Thus, a user can remove and replace the battery 118 whenever needed. It should be appreciated that the first and second portions 104, 106 and the cover 108 may cooperate to define a weatherproof housing 102 of the sensor 100. For example, the housing 102 may provide a sealed enclosure to prevent water, dust, oil, and the like from penetrating the housing 102. Thus, the sensor 100 can be used in a wide variety of harsh industrial environments and across a range of temperatures, humidity, and other conditions.

According to various aspects, the sensing arrangement 110 may include a first sensing element 130, a second sensing element 140, and a circuit board 122. According to various aspects, the first sensing element 130 may be an absolute pressure sensor for measuring the static pressure in the chamber 120. The first sensing element 130 may include a sensing port 132 open to the chamber 120 of the housing 102. The second sensing element 140 may be a differential pressure sensor. The second sensing element 140 may include a first sensing port 142 open to the chamber 120 of the housing 102 and a second sensing port 144. The second sensing port 144 may be configured as a barbed fitting 146 extending into the chamber 120.

Figure 2:
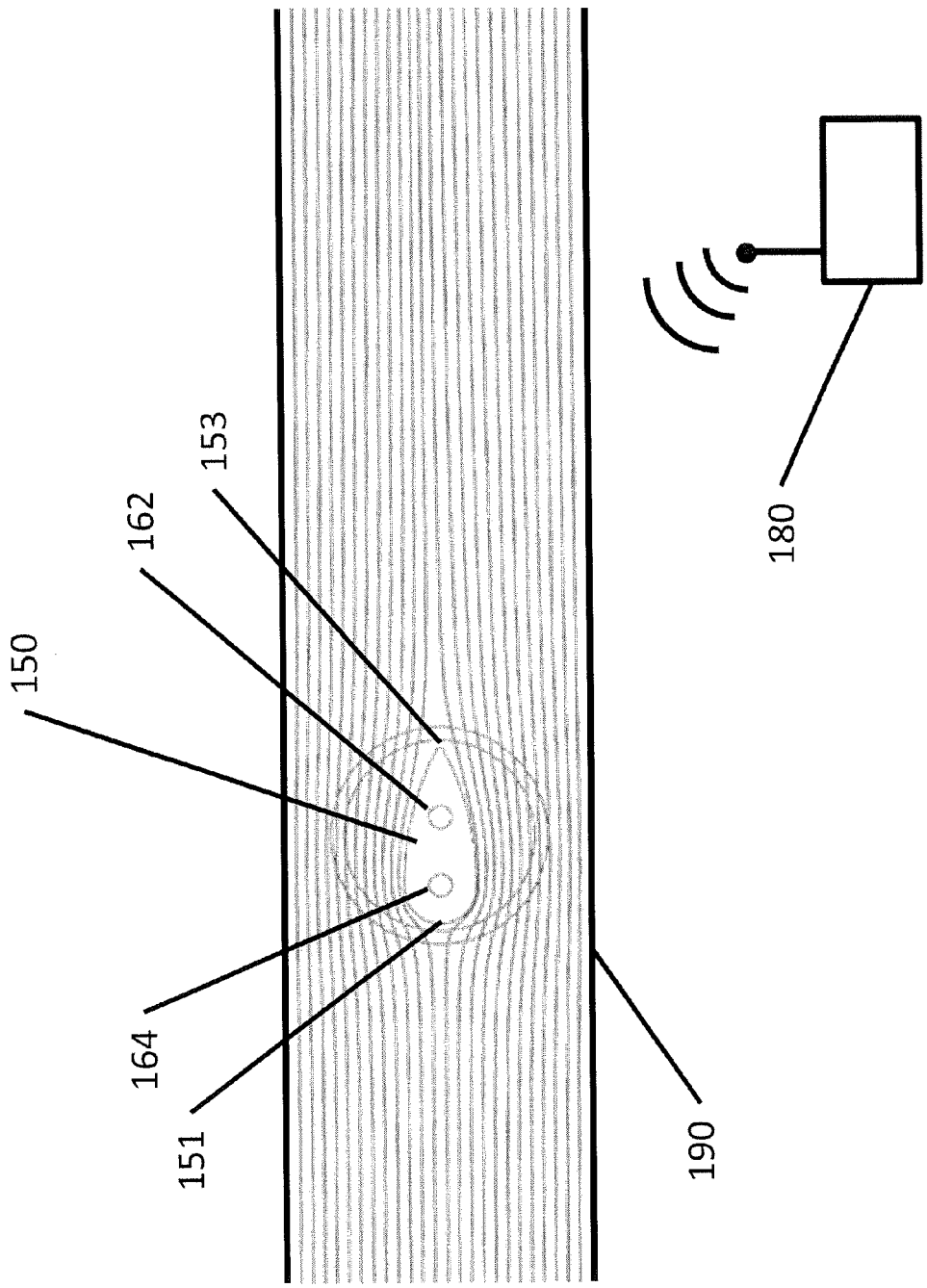
FIG. 2 is a cross-sectional view of the flow sensor of FIG. 1 taken along line II-II, including lines indicating exemplary fluid flow past the flow sensor tube.

The flow sensor 100 includes a tube 150 extending from the bottom 105 of the first portion 104 of the housing 102. The tube 150, for example, a Pitot Tube, may be designed with a cross-sectional profile (FIG. 2) that minimizes disturbance of fluid flow through the pipe 190 across the tube 150. That is, the shape of the tube 150 should encourage the fluid flow to stay adhered to the tube 150 regardless of the fluid flow speed. Otherwise, flow separation from the tube will cause randomness and noise in the measurements by first and second sensing elements 130, 140. In order to encourage higher pressure at an upstream surface 151 of the tube 150, the upstream surface 151 may be relatively blunt, and to encourage the flow to adhere to the tube 150, a downstream surface 153 may be a similar to a knife's edge. Referring to FIG. 2, in some aspects, the tube 150 may have a teardrop-shaped cross-sectional profile. As a result, the pressure is relatively high where the fluid collides with the upstream surface 151; i.e., higher than the ambient pressure of fluid in the pipe 190. At the downstream surface 153, the pressure is substantially equal to the ambient pressure of fluid in the pipe 190.

Referring again to FIG. 1, the tube 150 includes a first port 152 and a second port 154 located along a length of the tube. The first and second ports 152, 154 open in different directions about a periphery of the tube 150. When the flow sensor 100 is coupled with a pipe 190 to measure fluid flow through the pipe 190, the first and second ports 152, 154 are within the interior of the pipe 190, and the first port 152 is configured to be in a position not directly exposed to the fluid flow, as opposed to the second port 154 which is directly exposed to the fluid flow. Thus, the first port 152 may be referred to as the static pressure port, and the second port 154 may be referred to as the stagnation pressure port. The second port 154 is largely in line with and exposed to the oncoming fluid flow through the pipe 190 and therefore experiences an elevated, stagnation pressure. The first port 152 is located on the tube 150 such that it is not directly exposed to the oncoming fluid flow through the pipe 190 and essentially experiences only the static fluid pressure in the pipe 190.

The tube 150 includes a first conduit 162 and a second conduit 164. The first conduit 162 fluidly couples the first port 152 with the chamber 120 of the housing 102. The first port 152 is exposed to the ambient pressure in the pipe 190, from which ambient pressure fluid is then fluidly directed to the chamber 120 via the first conduit 162. Thus, the first sensing element 130 can measure the static pressure in the pipe 190 via the sensing port 132 open to the chamber 120.

The second conduit 164 fluidly couples the second port 154 with the chamber of the housing 102. The second conduit 164 may terminate in the housing via a barbed fitting 166. The barbed fitting 166 may be sized and arranged relative to the barbed fitting 146 of the second sensing port 144 of the second sensing element 140 such that a flexible hose 148 can be used to fluidly couple the two barbed fittings 146, 166. The flexible hose 148 sees only a small differential pressure, for example, 1 PSI or less, rather than the full pipe pressure, because the entire chamber 120 is exposed to the static fluid pressure in the pipe 190. The second, stagnation pressure port 154 is exposed to the stagnation pressure imparted to the tube 150 and thus measures the stagnation pressure (static pressure plus dynamic pressure) in the pipe 190. Thus, the second sensing element 140 can measure the difference in pressure between stagnation pressure in the pipe 190, via the second sensing port 144, and the static pressure in the pipe 190, via the first sensing port 142 open to the chamber 120. This measurement arrangement using a single differential sensing element to measure the dynamic pressure allows much higher accuracy than simply using 2 separate absolute pressure sensors to separately measure the static pressure and the stagnation pressure, because in many cases the dynamic pressure, or the difference between the stagnation pressure and the static pressure, is extremely small, several orders of magnitude smaller than the static pressure. Such a small dynamic pressure would be impossible to measure with a pressure sensor capable of withstanding the much higher static pressure because its resolution would be too coarse. Similarly, such a small dynamic pressure measurement would be impossible to make with 2 separate absolute sensors because seemingly minor manufacturing or calibration differences between the 2 sensors would dwarf the very small dynamic pressure. When combined with a measurement of fluid temperature in the pipe 190 by measuring the temperature in the chamber 120 with the temperature sensor 128 and knowledge of the inside diameter of the pipe 190, it is then possible to calculate the mass fluid flow through the pipe 190.

The circuit board 122 may include a circuit arrangement 126 designed and configured to perform desired signal conditioning. The sensing arrangement 110, the temperature sensor 128, the radio 114, and the antenna 116 are electrically coupled with one another so that the flow sensor 100 can wirelessly transmit data, for example, pressure and temperature data, to a remote receiver (not shown). The flow sensor 100 may include a pair of battery terminals 124 electronically coupled with and extending from the circuit board 122. The battery terminals 124 are contained by the housing 102 and configured to rigidly hold the battery 118 in electrical contact with the circuit board 122.

As shown in FIGS. 1 and 3, the circuit board 122 is arranged at a top end 107 of the first portion 104 of the housing. The first and second sensing elements 130, 140 extend from the circuit board 122 into the chamber 120. A pressure sensor board 121 may be substantially planar and extends in the same general dimension as the first and second sensing elements 130, 140. It should be appreciated that the first and second sensing elements 130, 140 are arranged in a 90° orientation relative to the substantially planar circuit board 122, and the pressure sensor board 121 is also oriented in a 90° orientation relative to the circuit board 122. In some aspects, in order to electronically connect the vertically-oriented sensing element 120 and board 121 with the horizontally-oriented circuit board 122, both boards 121, 122 can be manufactured as a single component with a flexible layer 123. After the circuit board is printed and populated, a portion 121 of the board can be cut away from the main portion 122 and allowed to flex 90 degrees via the flexible layer 123, thereby creating the two circuit boards 121, 122 oriented perpendicular to one another with flexible circuit traces connecting the two boards.

In some aspects, it may be desirable to have multiple different sensor types that can all use the same radio, thus only requiring certification of one radio for use with the various sensors. Accordingly, the radio 114 may be constructed as its own circuit board separate from the circuit board 122. The radio 114 can then be attached to various different sensors. The connection between the two boards can be achieved using land grid array (LGA) soldering rather than using any type of connector, since a connector would add size and cost and possibly fatigue and fail over time due to prolonged vibration. The LGA assembly process provides a common, compact interface that can be utilized across a variety of sensors, thereby allowing changes to either the radio or the sensor circuit without the requirement of changing both.

In order to maintain the circuit board 122, flexed layer 123, and pressure sensing board 121 rigidly in place, as well as to seal the chamber 120 at the top 107 of the first portion 104 of the housing 102 to contain the fluid pressure applied to chamber 120 from pipe 190 via passage 162, and to protect them and the sensing elements 130, 140 from environmental exposure, a portion 119 of the interior volume of the chamber 120 near the top 107 of the first portion 104 of the sensor housing 102 may be potted using a potting material 170, for example, a rigid two-part epoxy.

It should be appreciated that any or all of the supporting components of the sensor such as the battery 118, the circuit board 122, etc. may be located either inside or outside the chamber as a matter of manufacturing convenience. The sensing ports 132 and 142 of the pressure sensors must be exposed to the chamber fluid pressure and port 144 must be coupled to fluid conduit 164, but other components may be located as needed.

It should be appreciated that in some aspects, the two circuit boards 121, 122 can be connected by a right angle connector. However, right angle connectors can be more expensive, larger, and more likely to fail than a flex connector, thereby potentially leading to a larger profile sensor with lower reliability. It should also be appreciated that in some embodiments the two circuit boards 121, 122 can be combined into a single circuit board, albeit likely at an overall size penalty.

It should be appreciated that the circuit arrangement 126 may include a master controller (not shown), such that the radio 114, the antenna 116, and the master controller comprise a wireless communication part of the sensor 100. The wireless communication part supplies data from the master controller to a receiving arrangement, which may include, for example, a remote wireless data aggregator and/or processor 180. In some aspects, the sensor 100 sends the raw pressure and temperature values to the receiving arrangement. The processor 180 may also serve as a means to maintain remote control and monitoring of the sensor 100. It should be appreciated that in some aspects, the circuit arrangement 126 may be electrically coupled with the processor 180 via a wired connection. In still other aspects, the processor 180 may be incorporated into the sensor 100.

The processor 180 may be configured to determine fluid flow rate through the pipe 190. For example, by knowing the cross-sectional area of the pipe 190 and the density of the fluid flowing through the pipe 190, and by knowing the static pressure at port 152 and the difference in pressure between port 152 and port 154, the processor 180 can determine the mass flow rate of the fluid through the pipe, as would be understood by persons skilled in the art. The density can be mathematically determined by measuring the static pressure with the first sensing element 130 and the temperature with the temperature sensor 128, and then using values from standards tables, or by using a fixed, assumed value if the fluid in question is, for instance, a liquid which does not appreciably change in density. For additional accuracy if the fluid in question is a gas, the humidity of fluid in the chamber 120 can also be measured, but the humidity measurement is not necessary since it has only a minimal effect on the determination and compressed air/gas lines should be largely dry anyway.

The processor 180 can then determine fluid velocity in the pipe 190, which is a function of the differential pressure measured by the second sensing element 140 and the mathematically determined density. The velocity is proportional to the square root of the ratio of differential pressure and density. From there, the processor 180 can mathematically determine the actual mass flow rate.

In some optional embodiments, the processor 180 may include further programming/instructions to convert the actual mass flow rate of fluid in the pipe 190 to a "standard" flow rate, which basically represents the fluid flow rate at a standard pressure and temperature. For example, the processor 180 can be programmed to adjust the actual or "raw" mass flow rate to a "standard" flow rate based on the ratio of the actual pressure to a standard pressure e.g., 1 atmosphere) and the ratio of the actual temperature to a standard temperature (e.g., either 0° C. or 60° F., depending on user preference).

As discussed above, the radio 114 is connected to the antenna 116, which is used to optimally project and receive radio signals. The antenna 116 may be located remotely to the circuit arrangement 126 or sensor housing 102. The antenna 116 can be designed as a subsystem or element in the circuit arrangement 126. The antenna 116 may be a patch, chip, PCB antenna, or the like. In some embodiments, the antenna 116 may be located within but near the exterior of the sensor and with the greatest distance away from the large metal objects in the sensor 100.

Flow sensors in accordance with this disclosure may find particular utility with regard to calculating mass fluid flow through a pipe, but it should be appreciated that such sensors have many other applications. As one example of use, the flow sensor 100 may be temporarily or permanently mounted to the pipe 190. The sensor 100 then periodically or continuously measures the flow of fluid through the pipe 190 at that point and wirelessly transmits the data to a receiver at a central location so that the data can be monitored. Monitoring can be done solely by an operator, or software alarms can be set up to alert an operator in the event of exceedances or fault conditions. In this manner, a large number of monitoring points can all be monitored from one central location without the need to repeatedly visit each monitoring point in a facility and manually measure the flow rates in a walk-around fashion, and without the need to run wires to each monitoring point.

From the foregoing, it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A sensor, comprising:
   a housing including a body portion and a tube extending from the body portion, the body portion including a chamber;
   a static pressure port and a stagnation pressure port located along the tube;
   a static pressure conduit fluidly coupling the static pressure port of the tube to the chamber;
   a first pressure sensor configured to sense the fluid pressure in the chamber;
   a second pressure sensor having a first port and a second port, the second pressure sensor being a differential pressure sensor, the first port of the second pressure sensor being exposed to the fluid pressure in the chamber; and
   a stagnation pressure conduit fluidly coupling the stagnation pressure port of the tube with the second port of the second pressure sensor,
   wherein, when the static pressure port and the stagnation pressure port are disposed in a pipe having fluid flowing therethrough such that the stagnation pressure port is oriented to be more exposed to the flow relative to the static pressure port, a fluid flow rate through the pipe is determinable based on a static fluid pressure sensed by the first pressure sensor, a differential pressure measured by the second pressure sensor, a density of the fluid in the pipe, and a pre-determined diameter of the pipe.

2. The sensor of claim 1, further comprising a processor electronically coupled with the first pressure sensor and the second pressure sensor, the processor being configured to determine mass flow rate through the pipe.

3. The sensor of claim 2, wherein the processor is configured to convert the determined mass flow rate to standard flow rate.

4. The sensor of claim 2, further comprising a temperature sensor inside the chamber, the temperature sensor being electronically coupled with the processor.

5. The sensor of claim 4, further comprising a wireless transmitter configured to wirelessly transmit measurements by the first pressure sensor and the second pressure sensor and the temperature sensor to the processor.

6. The sensor of claim 1, further comprising a potting material configured to seal the chamber and contain the fluid directed to the chamber.

7. The sensor of claim 1, further comprising a flexible hose configured to fluidly couple the stagnation pressure port with the second port of the second pressure sensor.

8. The sensor of claim 1, wherein the tube has a cross-sectional profile in a direction of fluid flow that is selected to encourage fluid flow to stay adhered to the tube regardless of fluid flow speed.

9. The sensor of claim 1, wherein the tube has a teardrop-shaped cross-section in a direction of fluid flow.

10. The sensor of claim 1, wherein the stagnation pressure port is at a blunted upstream surface of the tube structured such that fluid collides with the upstream surface producing a higher pressure at the stagnation pressure port than ambient pressure of fluid in the pipe.

11. The sensor of claim 1, wherein the static pressure port is at a surface of the tube structured such that fluid pressure at the static pressure port is substantially equal to ambient pressure of fluid in the pipe.

12. A method for determining fluid flow through a pipe, comprising:
    coupling a sensor assembly with a pipe having fluid flowing therethrough, the sensor assembly having a static pressure port and a stagnation pressure port in the pipe, the static pressure port being less directly exposed to the fluid flow relative to the stagnation pressure port;
    directing fluid from the static pressure port to a chamber of the sensor assembly;
    sensing fluid pressure in the chamber with a first pressure sensor;
    sensing a difference in fluid pressure between the stagnation pressure port and the static pressure port with a differential pressure sensor;
    measuring a temperature of the fluid in the pipe to determine its density or otherwise knowing the density from standard values; and
    determining a fluid flow rate through the pipe based on the fluid pressure sensed by the first pressure sensor, a differential pressure measured by the differential pressure sensor, a density of the fluid in the pipe, and a pre-determined diameter of the pipe.

13. The method of claim 12, further comprising sensing the temperature of the fluid in the chamber with a temperature sensor, and wherein the determined fluid flow rate is also based on the fluid temperature in the chamber sensed by the temperature sensor.

14. The method of claim 12, wherein the determined fluid flow rate is mass flow rate through the pipe.

15. The method of claim 14, further comprising converting the determined mass flow rate to standard flow rate.

16. The method of claim 12, further comprising potting a portion of the chamber to seal the chamber and contain the fluid directed to the chamber.

17. The method of claim 12, further selecting a cross-sectional profile of the tube that encourages fluid flow to stay adhered to the tube regardless of fluid flow speed.

18. The method of claim 17, wherein the tube has a teardrop-shaped cross-section in a direction of fluid flow.

19. The method of claim 12, wherein the stagnation pressure port is at a blunted upstream surface of the tube structured such that fluid collides with the upstream surface producing a higher pressure at the stagnation pressure port than ambient pressure of fluid in the pipe.

20. The method of claim 12, wherein the static pressure port is at a surface of the tube structured such that fluid pressure at the static pressure port is substantially equal to ambient pressure of fluid in the pipe.

21. A sensor, comprising:
    a housing including a body portion and a tube extending from the body portion, the body portion including a chamber;
    a static pressure port located along the tube and fluidly coupled with the chamber;
    an absolute pressure sensor configured to sense the fluid pressure in the chamber;
    a differential pressure sensor; and
    a stagnation pressure port located along the tube and fluidly coupled with the differential pressure sensor, the differential pressure sensor being configured to determine a pressure difference between the fluid pressure in the chamber and the fluid pressure at the stagnation pressure port,
    wherein, when the static pressure port and the stagnation pressure port are disposed in a pipe having fluid flowing therethrough such that the stagnation pressure port is more exposed to the fluid flow relative to the static pressure port, a fluid flow rate through the pipe is determinable based on a fluid pressure sensed by the first pressure sensor, a differential pressure measured by the differential pressure sensor, a density of the fluid in the pipe, and a pre-determined diameter of the pipe.

22. The sensor of claim 21, further comprising a processor electronically coupled with the first pressure sensor and the second pressure sensor, the processor being configured to determine mass flow rate through the pipe.

23. The sensor of claim 22, further comprising a temperature sensor inside the chamber, the temperature sensor being electronically coupled with the processor.

24. The sensor of claim 23, further comprising a wireless transmitter configured to wirelessly transmit measurements by the first pressure sensor, the second pressure sensor, and the temperature sensor to the processor.

* * * * *